United States Patent Office 2,957,783
Patented Oct. 25, 1960

2,957,783
PROCESS OF FINISHING LEATHER

Karl Dachs, Rudolf Schubert, and Hans Wilhelm, all of Ludwigshafen (Rhine), Germany, assignors to Badische Anilin- & Soda-Fabrik Aktiengesellschaft, Ludwigshafen (Rhine), Germany No Drawing. Filed May 14, 1957, Ser. No. 658,936

Claims priority, application Germany May 16, 1956

12 Claims. (Cl. 117—73)

This invention relates to a new and improved method of finishing leather with polyamides prepared in part from known compounds and in part from compounds having long side chains, the two types of products being capable of forming polyamides.

Leather coatings of polyamides on the basis of dicarboxylic acids, diamines, and lactams have heretofore already been known. The coatings prepared with the polyamides have a very high rub and scuff resistance. Moreover they impart to the leather a high fastness to perspiration. Since the polyamides have a bad compatibility with the collodion pigment finishes, the polyamides are applied as coatings similar to protective varnish, on a polymer or nitrocellulose layer which seals the leather surface. The polyamide films do not adhere sufficiently to bottomings which are bound by casein.

In order to increase the properties of the polyamides which are especially desirable for leather coatings, such as flexibility and elasticity, they are in general used together with softeners, for example esters of aromatic acids or sulphonic acid amides. The surface hardness is however diminished by the softeners, and consequently also the rub and scuff resistance. Moreover, when the coated leather is stored, the softener tends to migrate into the leather so that the coating gradually loses its flexibility.

The solvents in which the usual polyamides are smoothly soluble are not suitable for use for coating leather. Aqueous alcohols, to the use of which there are no objections, only dissolve the polyamides hitherto used for leather coatings when heated. When the solutions are cooled, they gelatinize. Since alcohols have almost no swelling action on nitrocellulose coating layers and only swell slowly and slightly covering layers of polymers, a satisfactory union of the polyamide layers applied from aqueous-alcoholic solution with the bottoming is not ensured. If however, in order to improve the union of the alcoholic polyamide solutions, there are added thereto the usual diluents and lacquer solvents for leather finishing, such as esters or ketones, the polyamides are precipitated from the solutions.

The object of the present invention is to provide polyamides which form supple and elastic coatings on leather without the addition of softeners.

A further object of the invention is to provide polyamides which have good solubility in alcohols of low molecular weight and which are only very little or not at all precipitated from these solutions by further organic solvents such as water miscible organic solvents or solvents such as carboxylic acid esters.

A further object of the invention is the production of well-adherent coverings and coatings of polyamides on bottomed and unbottomed leather.

The objects of the invention are achieved by polyamides which have been prepared from compounds capable of forming polyamides and additionally from compounds capable of polyamide formation of which the molecule is strongly branched. By a strongly branched molecule we mean in the present specification a diamine, dicarboxylic acid or dicarboxylic acid derivative capable of forming a polyamide, the amino groups, carboxylic groups, carboxylic ester groups, or carboxylic acid chloride groups of the said compounds being joined by a chain of about 6 to 12 carbon atoms, the said chain containing a lateral branch consisting of 7 to 10 carbon atoms.

Strongly branched dicarboxylic acids of the said kind are obtained for example by reaction of olefine carboxylic acids of at least 14 carbon atoms with carbon monoxide and water in the presence of catalysts. This reaction proceeds according to the following scheme:

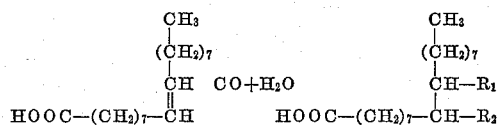

in which one R is a COOH group and the other R is hydrogen. Useful also are mixtures of these two dicarboxylic acids.

Among compounds capable of polyamide formation there are included lactams, such as caprolactam, caprylic lactam, aliphatic or aromatic diamines with 2 or more carbon atoms, having the formula $H_2N-X-NH_2$ wherein X is a divalent radical containing from 2 to 10 carbon atoms, for example aliphatic diamines with a straight or branched chain of carbon atoms, such as ethylene diamine, tetramethylene diamine, octamethylene diamine, decamethylene diamine and hexamethylene diamine, 4.4-diamino-dicyclohexylmethane, 4.4'-diamino-dicyclohexyl, metaphenylene diamine and aliphatic or aromatic dicarboxylic acids with 6 or more carbon atoms, for example adipic acid, sebacic acid, suberic acid, decamethylene dicarboxylic acid and heptamethylene dicarboxylic acid. Instead of the said dicarboxylic acids and diamines their derivatives also can be used for the preparation of the polyamides which are capable of polyamide formation, as for example the esters, acid chlorides, acid amides, acid hydrazides, nitriles (in the presence of water) and the acyl derivatives of the diamines formed with acids which are readily cleared, for example acetic acid.

The preparation of the said dicarboxylic acids having a side chain has been described in the copending U.S. patent application Ser. No. 646,958, filed March 19, 1957, now abandoned, by Walter Reppe, Nikolaus von Kutepow, Hans Wilhelm and Karl Dachs. The said application also teaches the preparation of the polyamides by conventional methods. For example, the dicarboxylic acids having side chains and the diamines can, either in form of their salt or by themselves, be supplied to the charging stock for the polyamide condensation. The condensation itself can be carried out in the way usual for the production of polyamides, preferably in an indifferent gas atmosphere, at 140° to 300° C. or more, either under pressure or without pressure or at reduced pressure. In many cases it is preferable to add the usual catalysts, for example benzoic acid, acetic acid, adipic acid or the like, in order to achieve definite molecular sizes and the properties associated therewith, for example corresponding hardness, solubility and viscosity.

The following two examples are intended to illustrate the manufacture of the polyamides without restricting the invention thereto.

Example I 18 parts of a salt of 4.4'-diaminodicyclohexylmethane and 1-octyl-nonane dicarboxylic acid-1.9 are condensed with 6 parts of capryllic lactam and 6 parts of hexamethylene diamine adipic acid salt for 7 hours at 260° C. in a current of nitrogen without pressure. The resultant transparent product has a K-value of 65 measured in formic acid. It dissolves well in cold methanol, ethanol and propanol and moreover in the form of alcoholic solutions is compatible with ethyl acetate and solutions of cellulose nitrate in ethyl acetate, and also with acetone and solutions of etherified urea resins in butanol.

*Example II*

140 parts of capryllic lactam, 140 parts of a salt of 1-octylnonane dicarboxylic acid-1.9 and hexamethylene diamine, 44 parts of adipic acid and 26 parts of 1.3-aminopropanol are heated in an autoclave under their own pressure for 2 hours at 280° C. in the presence of 0.6 part of acetic acid. Then, after pressure equilibrium has been set up, the water formed during the reaction is distilled off. The condensate is kept for another 4 hours at a temperature of 280° C. under a nitrogen atmosphere. The transparent polyamide thereby formed has a K-value of 50 and is soluble in alcohols.

The proportion of the strongly branched polyamide-forming compound, for example strongly branched dicarboxylic acid, together with the equimolar amount of diamine can amount to about 15 to 85 percent by weight with reference to the total amount of polyamide-forming compounds. The remaining 85 to 15 percent by weight can consist of a lactam or a dicarboxylic acid together with the equimolar amount of diamine. The polyamides are prepared in known manner by condensation from the mixture of polyamide-forming compounds.

It is advantageous to prepare the polyamides intended for coating leather from more than two initial materials capable of forming polyamides. Such polyamides are obtained for example from (1) a strongly branched dicarboxylic acid and the equimolar amount of a diamine, (2) a lactam, such as caprolactam, and (3) adipic acid and the equimolar amount of a diamine, for example hexamethylene diamine. Caprylic lactam may also be used instead of the compounds specified under (3) or also used additionally to the compounds specified under (1), (2) and (3).

The combination possibilities may be seen from the following statement, but this statement is intended to serve merely for explanation and has no limiting significance:

(1) (*a*) Strongly branched dicarboxylic acid; (*b*) diamine (15 to 85 percent of these two compounds with reference to the whole initial material capable of forming polyamides).

(2) Lactam.

(3) (*c*) A usual dicarboxylic acid; (*d*) diamine.

(4) Lactam, other than 2.

(5) (*e*) A usual dicarboxylic acid, other than 3(*c*); (*f*) diamine.

It is necessary that component 1 should be present in the combinations used for the production of the polyamides. Besides component 1, there may be present 2 or 3, or 2 and 3, or 2 and 4, or 3 and 5, or 2 and 3 and 4, or 2 and 3 and 5 or 2 and 3 and 4 and 5. If the Figure 1 component amounts to no more than 15 parts in 100 parts of the overall quantity of the polyamide-forming stock, the remaining 85 parts preferably consist of at least two of the components enumerated under Figures 2 to 5 above. The said two components are advantageously employed in a quantitative ratio varying between 15:70 and 70:15. It is understood that the purpose of the aforesaid list is to name the components which go into the formulation of the polyamides. The list is by no means intended to indicate any order in which the polyamide-forming radicals are contained in the finished polyamide molecule. Any such order has no significance regarding our invention. Everyone skilled in the art knows that a copolyamide formed in the condensation of the mixture of the polyamide-forming stock cannot, in its molecules, contain the polyamide-forming radicals in the order of the above list. It is also of no consequence whether the diamines and the dicarboxylic acids, on being added to the charging stock for the polyamide condensation, are used as the salt formed by their interaction or by themselves.

1(*b*), 3(*d*) and 5(*f*) may be identical or different aliphatic diamines with 2 to 10 carbon atoms between the amino groups or diamines with cycloaliphatic or aromatic radicals or hetero atoms between the amino groups. Preferred examples of 1(*b*) are 4.4'-diaminodicyclohexylmethane or 4.4'-diaminodicyclohexyl. As lactams there come into question caprolactam, caprylic lactam, or oenanthlactam, i.e. lactams having 6 to 8 carbon atoms in the lactam ring. They are the lactams which are capable of forming polyamides under the conditions indicated in the said copending U.S. application Serial No. 646,958, now abandoned. The said lactams can also bear substituents on their carbon atoms, for example methyl, ethyl, propyl or other alkyl radicals. The lactams can bear substituents, for example alkyl radicals, on the carbon atoms. As dicarboxylic acids which may be used there may be specified aliphatic dicarboxylic acids which have 2 to 11 carbon atoms between the carboxylic groups. The solutions ready for use may contain for example 10 to 40 parts by weight of polyamide in 100 parts by weight of isopropyl alcohol. The 20 percent solution in isopropyl alcohol of a polyamide from 40 parts by weight of a salt of 1-nonyloctane dicarboxylic acid-(1.8) and 4.4'-diamino dicyclohexylmethane, 20 parts caprylic lactam, 20 parts caprolactam and 20 parts of the salt of adipic acid and hexamethylene diamine has an outflow time of 80 to 120 seconds from a Ford beaker of 100 millilitres with a jet opening of 4 millimetres at 20° to 22° C. The 1 percent solution of said polyamide in formic acid has a relative viscosity of 2.1. Generally speaking those polyamides can be used of which the 1 percent formaic acid solutions have a relative viscosity of from 1.1 to 3.2.

The said polyamides in their use and in wear show considerable advantages as compared with the known polyamides. They dissolve well not only in hot, but also in cold alcohol. The solutions are stable in storage; they do not gelatinise, even at temperatures near to the freezing point and can be diluted to solutions ready for use and worked up without difficulty and without previous heating. The solutions are sufficiently compatible with esters, ketones and hydrocarbons. As solvents there may be used monohydric or polyhydric alcohols, preferably those having 1 to 4 carbon atoms in the molecule, or mixtures of these alcohols, for example methyl alcohol, ethyl alcohol, propyl alcohol, isopropyl alcohol, butyl alcohol, isobutyl alcohol, tertiary butyl alcohol, glycol, gycol monomethyl ether, and butane-diol-(1.4).

With the polyamides herein described there are obtained, without the use of softeners, elastic and supple coatings which do not undergo change even after storage for a long time. Moreover it is possible, by varying the proportion of the branched components capable of forming polyamides, to adjust the film elasticity according to desire and special requirements. Since the polyamides herein described are compatible with softeners, such as esters of aromatic acids and amides of aromatic sulfonic acids, in the same way as the known polyamides, there is nothing to prevent the additional use of softeners for special purposes of use.

The compatibility of the alcoholic polyamide solutions according to this invention with the usual diluents and varnish solvents such as the esters of alcohols having 1 to 6 carbon atoms in the molecule, such as methyl, ethyl, propyl, butyl, hexyl or cyclohexyl alcohols, with formic, acetic, propionic, butyric, capronic acids or a similar aliphatic carboxylic acid, ketones such as acetone or methylethyl ketone and glycerol for finishing leather renders it possible to add these agents so that the coatings become firmly attached to the polymer and nitrocellulose layers. The polymer bottoming can be prepared for example from polymers of arcrylic or methacrylic acid esters or their copolymers with acrylonitrile, vinyl chloride, vinylidene chloride, styrene or butadiene. They may also consist of mixtures of the polymers with casein, waxes and pigments.

A special advantage of the polyamides herein described is that they can also be used for leather finishing without polymer or nitrocellulose bottoming, for they are compatible with nitrocellulose and can be used together with the usual collodion coating colors and pigmented. The finishes are very fast to rubbing, stable to moisture and resistant to stress by bending.

The following examples will further illustrate this invention but the invention is not restricted to these examples. The parts are parts by weight.

*Example 1*

Chrome-tanned kid leather for clothing purposes which has been coated with commercial casein pigment finishes and polymer binders in aqueous dilution is sprayed, after the aqueous top coat has been dried, with 5 parts of a polyamide from 40 parts of a salt of 1-nonyl-octane dicarboxylic acid-(1.8) and 4.4'-diamino-dicyclohexylmethane, 20 parts of caprylic lactam 20 parts of caprolactam and 20 parts of the hexamethyl diamine salt of adipic acid, the said polyamide having been dissolved in 50 parts of ethyl alcohol, 20 parts of normal propyl alcohol and 25 parts of ethylene glycol diethyl ether. After drying, a glossy, smooth, elastic coating is obtained which perfectly adheres to the top coat. It has an outstanding fastness to rubbing which cannot be obtained with other equally elastic protective coatings, for example those prepared on a nitrocellulose basis.

*Example 2*

Bark-tanned or vegetable-synthetic tanned kid leather which has been coated with commercial collodion pigment finishes is sprayed with 4 parts of a polyamide from 60 parts of a salt of 1-octyl-nonane dicarboxylic acid-(1.9) and 4.4'-diaminodicyclohexylmethane, 20 parts of caprylic lactam and 20 parts of hexamethylene diamine adipate, the said polyamide having been dissolved in 50 parts of ethyl alcohol, 16 parts of isopropyl alcohol and 30 parts of butyl acetate. A glossy smooth coating is obtained which has an outstanding fastness to rubbing and therefore provides a leather especially suitable, for example, for bookbinding.

*Example 3*

Combination-tanned light split cow hides which have been bottomed with a commercial polymer binders is coated with a mixture of a pigment finish consisting of 15 parts of commercial collodion pigment finish, 1 part of castor oil, 0.5 part of dibutyl phthalate, 3 parts of a polyamide from 25 parts of a salt of 1-nonyl-octane dicarboxylic acid - (1.8) and 4.4' - diaminodicyclohexylmethane, 25 parts of caprylic lactam, 25 parts of caprolactam and 25 parts of hexamethylene diamine adipate, 36.5 parts of ethyl alcohol, 12 parts of butyl alcohol, 16 parts of ethylene glycol diethyl ether and 16 parts of butyl acetate and finally sprayed with a solution of 6 parts of a polyamide from 50 parts of a salt of 1-octyl-nonane dicarboxylic acid-(1.9) or 1-nonyl-octane dicarboxylic acid-(1.8) and 4.4'-diaminodicyclohexylmethane, 25 parts of caprolactam and 25 parts of hexamethylene diamine adipate in 30 parts of ethyl alcohol, 24 parts of normal propyl alcohol, 10 parts of ethylene glycol diethyl ether and 30 parts of butyl acetate. A smooth, glossy, elastic coating is obtained which is characterized by an outstanding fastness to water, scratching and rubbing. The leather obtained is especially suitable for all types of upholsteries.

*Example 4*

Chrome-tanned kid leather for clothing purposes which has been coated with commercial casein pigment finishes and polymer binders in aqueous dilution is sprayed, after the aqueous top coat has been dried, with 5 parts of a polyamide from 80 parts of 1-nonyloctane dicarboxylic acid-(1.8) and the equimolecular amount of 4.4'-diaminodicyclohexylmethane and 20 parts of capryllactam, the said polyamide having been dissolved in 50 parts of ethyl alcohol, 20 parts of normal propyl alcohol and 25 parts of ethylene glycol diethyl ether. After drying, a glossy, smooth, elastic coating is obtained which perfectly adheres to the top coat. It has an outstanding fastness to rubbing which cannot be obtained with other equally elastic protective coatings, for example those prepared on a nitrocellulose basis.

*Example 5*

Bark-tanned or vegetable-synthetic tanned kid leather which has been coated with commercial collodion pigment finishes is sprayed with 4 parts of a polyamide from 30 parts of 1-nonyloctandicarboxylic acid-(1.8), 1-octylnonandicarboxylic acid-(1.9) and hexamethylene diamine, 30 parts of 4.4'-diaminodicyclohexylmethane adipate, 20 parts of caprolactam and 20 parts of the sebacic acid salt of hexamethylene diamine, the said polyamide having been dissolved in 50 parts of ethyl alcohol, 16 parts of isopropyl alcohol and 30 parts of butyl acetate. A glossy smooth coating is obtained which has an outstanding fastness to rubbing and therefore provides a leather especially suitable, for example, for bookbinding.

*Example 6*

Combination-tanned light split cow hides which have been bottomed with a commercial polymer binder is coated with a mixture of a pigment finish consisting of 15 parts of commercial collodion pigment finish, 1 part of castor oil, 0.5 part of dibutyl phthalate, 3 parts of a polyamide from 20 parts of a salt from 1-nonyloctanedicarboxylic acid-(1.8), 1-octylnonandicarboxylic acid-(1.9) and octamethylene diamine, 20 parts of capryllactam, 20 parts of caprolactam, 20 parts of hexamethylene diamine adipate, 20 parts of the sebacic acid salt of hexamethylene diamine, 36.5 parts of ethyl alcohol, 12 parts of butyl alcohol, 16 parts of ethylene glycol diethyl ether and 16 parts of butyl acetate and finally sprayed with a solution of 6 parts of a polyamide from 50 parts of a salt of 1-octyl-nonane dicarboxylic acid-(1.9) or 1-nonyloctane dicarboxylic acid-(1.8) and 4.4'-diaminodicyclohexylmethane, 25 parts of caprolactam and 25 parts of hexamethylene diamine adipate in 30 parts of ethyl alcohol, 24 parts of normal propyl alcohol, 10 parts of ethylene glycol diethyl ether and 30 parts of butyl acetate. A smooth, glossy, elastic coating is obtained which is characterized by an outstanding fastness to water, scratching and rubbing. The leather obtained is especially suitable for all types of upholsteries.

We claim:

1. Process which comprises finishing leather with a softener-free solution in a 1 to 4 carbon atom alcohol, of a polyamide of which 100 parts by weight of the polyamide-forming stock contain the following components:

(A) 15 to 85 parts by weight of an aliphatic dicarboxylic acid with from 6 to 12 carbon atoms between the carboxylic acid groups and an aliphatic side chain of from 7 to 10 carbon atoms plus the equimolecular amount of a diamine of the formula $H_2N-X-NH_2$ wherein X is a diradical with from 2 to 10 carbon atoms;

(B) 85 to 15 parts by weight of at least one polyamide-forming material selected from the group consisting of
(a) caprolactam,
(b) capryllactam,
(c) oenanthlactam, and
(d) a dicarboxylic acid with from 6 to 10 carbon atoms plus the equimolecular amount of a diamine of the formula H₂N—X—NH₂ wherein X is a diradical with from 2 to 10 carbon atoms.

2. Process which comprises finishing leather with a softener-free solution in a 1 to 4 carbon atom alcohol, of a polyamide of which 100 parts by weight of the polyamide-forming stock contain the following components:

(A) 15 to 70 parts by weight of an aliphatic dicarboxylic acid with from 6 to 12 carbon atoms between the carboxylic acid groups and an aliphatic side chain of from 7 to 10 carbon atoms plus the equimolecular amount of a diamine of the formula H₂N—X—NH₂ wherein X is a diradical with from 2 to 10 carbon atoms;

(B) 15 to 70 parts by weight of a lactam selected from the group consisting of capraolactam and capryllactam;

(C) 70 to 15 parts by weight of an aliphatic dicarboxylic acid with from 6 to 10 carbon atoms in the molecule plus the equimolecular amount of a diamine of the formula H₂N—X—NH₂ wherein X is a diradical with from 2 to 10 carbon atoms.

3. Process which comprises finishing leather with a softener-free solution in a 1 to 4 carbon atom alcohol, of a polyamide of which 100 parts by weight of the polyamide-forming stock contain the following components:

(A) 15 to 70 parts by weight of an aliphatic dicarboxylic acid with from 6 to 12 carbon atoms between the carboxylic acid groups and an aliphatic side chain of from 7 to 10 carbon atoms plus the equimolecular amount of a diamine of the formula H₂N—X—NH₂ wherein X is a diradical with from 2 to 10 carbon atoms;

(B) 15 to 70 parts by weight of caprolactam;

(C) 70 to 15 parts by weight of capryllactam.

4. Process which comprises finishing leather with a softener-free solution in a 1 to 4 carbon atom alcohol, of a polyamide of which 100 parts by weight of the polyamide-forming stock contain the following components:

(A) 15 to 70 parts by weight of an aliphatic dicarboxylic acid with from 6 to 12 carbon atoms between the carboxylic acid groups and an aliphatic side chain of from 7 to 10 carbon atoms plus the equimolecular amount of a diamine of the formula H₂N—X—NH₂ wherein X is a diradical with from 2 to 10 carbon atoms;

(B) two different dicarboxylic acids with from 6 to 10 carbon atoms in a quantitative ratio which together with the equimolecular quantity of a diamine of the formula H₂N—X—NH₂ ranges from 15:70 to 70:15.

5. Process which comprises finishing leather with a softener-free solution in a 1 to 4 carbon atom alcohol, of a polyamide of which 100 parts by weight of the polyamide-forming stock contain the following components:

(A) 15 to 85 parts by weight of a dicarboxylic acid of the formula

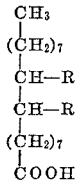

wherein one of the R stands for H and the other R stands for COOH, plus the equimolecular amount of a diamine of the formula H₂N—X—NH₂;

(B) 85 to 15 parts by weight of at least one polyamide-forming material selected from the group consisting of
 (a) caprolactam,
 (b) capryllactam,
 (c) oenanthlactam, and
 (d) a dicarboxylic acid with from 6 to 10 carbon atoms in the molecule plus the equimolecular amount of a diamine of the formula H₂N—X—NH₂ wherein X is a diradical with from 2 to 10 carbon atoms.

6. The process as claimed in claim 5 wherein the leather prior to being finished with the polyamide is provided with a bottoming layer containing a member selected from the group consisting of nitrocellulose, acrylic acid ester polymer, methacrylic acid ester polymer, and copolymers of said esters with other vinyl compounds.

7. The process as claimed in claim 5 wherein at least one equivalent of one of the dicarboxylic acids is 4,4'-diaminodicyclohexylmethane.

8. Process which comprises finishing leather with a softener-free solution in a 1 to 4 carbon atom alcohol, of a polyamide of which the polyamide-forming stock contains the following components:

(A) 15 to 70 parts by weight of a dicarboxylic acid of the formula

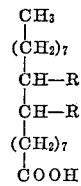

wherein one of the R stands for H and the other R stands for COOH, plus the equimolecular amount of a diamine of the formula H₂N—X—NH₂;

(B) 15 to 70 parts by weight of at least one polyamide-forming material selected from the group consisting of
 (a) caprolactam,
 (b) capryllactam,
 (c) oenanthlactam, and
 (d) a dicarboxylic acid with from 6 to 10 carbon atoms in the molecule plus the equimolecular amount of a diamine of the formula H₂N—X—NH₂ wherein X is an aliphatic diradical with from 2 to 10 carbon atoms;

(C) 15 to 70 parts by weight of one of the polyamide-forming materials listed under (B) which is different from the one used under (B).

9. Process which comprises finishing leather with a softener-free solution in a 1 to 4 carbon atom alcohol, of a polyamide of which the polyamide-forming stock contains the following components:

(A) 15 to 70 parts by weight of a dicarboxylic acid of the formula

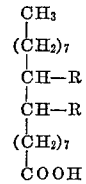

wherein one of the R stands for H and the other R stands for COOH, plus the equimolecular amount of a diamine of the formula H₂N—X—NH₂;

(B) 15 to 70 parts by weight of at least one polyamide-forming material selected from the group consisting of
 (a) caprolactam,
 (b) capryllactam,
 (c) oenanthlactam, and
 (d) a dicarboxylic acid with from 6 to 10 carbon atoms in the molecule plus the equimolecular amount of a diamine of the formula H₂N—X—NH₂ wherein X is an aliphatic diradical with from 2 to 10 carbon atoms;

(C) 15 to 70 parts by weight of one of the polyamide-forming materials listed under (B) which is different from the one used under (B);

(D) 15 to 70 parts by weight of one of the polyamide-forming materials listed under (B) which is different from any of the polyamide-forming materials used under (B) and (C).

10. Finished leather including an adherent protective coating of a dried softener-free solution in a 1 to 4 carbon atom alcohol, of a polyamide obtained from the following components:

(A) 15 to 85 parts by weight of an aliphatic dicarboxylic acid with from 6 to 12 carbon atoms between the carboxylic acid groups and an aliphatic side chain of from 7 to 10 carbon atoms plus the equimolecular amount of a diamine of the formula $H_2N-X-NH_2$ wherein X is a diradical with from 2 to 10 carbon atoms;

(B) 85 to 15 parts by weight of at least one polyamide-forming material selected from the group consisting of
 (a) caprolactam,
 (b) capryllactam,
 (c) oenanthlactam, and
 (d) a dicarboxylic acid with from 6 to 10 carbon atoms in the molecule plus the equimolecular amount of a diamine of the formula $H_2N-X-NH_2$ wherein X is a diradical with from 2 to 10 carbon atoms.

11. The process of finishing leather as defined in claim 1 wherein said solution contains a diluent selected from the class consisting of aliphathic carboxylic acid esters of 1 to 6 carbon atom alcohols, acetone, methylethyl ketone, glycerol, and ethylene glycol diethyl ether.

12. The process which comprises finishing leather having a nitrocellulose bottoming layer, with a solution consisting of a polyamide dissolved in a mixture of 50 parts of ethyl alcohol, 16 parts of isopropyl alcohol and 30 parts of butyl acetate, in parts by weight, said polyamide being formed from 60% of a salt of 1-octyl-nonane dicarboxylic acid-(1,9) and 4,4'-diaminodicyclohexylmethane, 20% of caprylic lactam, and 20% of hexamethylene diamine adipate, in percentages by weight.

References Cited in the file of this patent
UNITED STATES PATENTS

| | | |
|---|---|---|
| 2,302,332 | Leekley | Nov. 17, 1942 |
| 2,372,090 | Kirkpatrick | Mar. 20, 1945 |
| 2,714,097 | Watson et al. | July 26, 1955 |
| 2,756,257 | Stamatoff | July 24, 1956 |
| 2,769,733 | Pool | Nov. 6, 1956 |